(12) United States Patent
Becerra et al.

(10) Patent No.: US 9,331,614 B2
(45) Date of Patent: May 3, 2016

(54) SYSTEMS AND METHODS FOR CONTROLLING ELECTRIC MACHINES

(71) Applicant: Regal Beloit America, Inc., Beloit, WI (US)

(72) Inventors: Roger Carlos Becerra, Fort Wayne, IN (US); Yao Da, Fort Wayne, IN (US); Ludovic Andre Chretien, Columbia City, IN (US); Peizhong Yi, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 438 days.

(21) Appl. No.: 13/763,283

(22) Filed: Feb. 8, 2013

(65) Prior Publication Data

US 2014/0225545 A1     Aug. 14, 2014

(51) Int. Cl.
*H02P 6/14*         (2006.01)
*H02P 23/00*       (2006.01)

(52) U.S. Cl.
CPC .............. *H02P 6/14* (2013.01); *H02P 23/0081* (2013.01)

(58) Field of Classification Search
CPC .................................. H02P 6/14; H02P 23/00
USPC .................... 318/400.1, 400.26, 700
See application file for complete search history.

(56) References Cited

U.S. PATENT DOCUMENTS

| | | | |
|---|---|---|---|
| 7,053,569 B2 | 5/2006 | Takahashi | |
| 7,095,208 B2 | 8/2006 | Kawaji et al. | |
| 7,650,760 B2 | 1/2010 | Nakata et al. | |
| 2009/0295229 A1* | 12/2009 | Harke | H02M 7/217 307/75 |
| 2011/0038192 A1* | 2/2011 | Kawashima | H02M 1/4233 363/127 |
| 2013/0063058 A1* | 3/2013 | Shouji | H02M 7/53875 318/400.06 |
| 2013/0088903 A1* | 4/2013 | Sagona | H02M 7/797 363/125 |
| 2013/0335041 A1* | 12/2013 | Baek | H02M 7/12 322/89 |
| 2014/0119074 A1* | 5/2014 | Courtney | H02M 1/14 363/70 |

FOREIGN PATENT DOCUMENTS

| | | |
|---|---|---|
| EP | 2040373 A1 | 3/2009 |
| EP | 1521358 B1 | 6/2011 |
| EP | 1465333 B1 | 10/2012 |
| WO | 2012098873 A1 | 7/2012 |

OTHER PUBLICATIONS

Haga et al., "Unity power factor control method of single-phase to three-phase power converter without reactor and electrolytic capacitor", European Conference on Power Electronics and Applications, 2005, 7 pages, Dresden.
Haga, et al., "Direct torque IPM motor control method to obtain unity power factor using a single-phase diode rectifier", 2003, Electrical Machines and Drives Conference, 1-4 2003, pp. 1078-1083, vol. 2, Nigata, Japan.

(Continued)

*Primary Examiner* — Kawing Chan
(74) *Attorney, Agent, or Firm* — Armstrong Teasdale LLP (57) ABSTRACT

A motor controller is provided that includes an inverter configured to drive an electric motor, a rectifier configured to rectify an alternating current (AC) input current and to output the rectified AC input current to the inverter, and a controller coupled to the inverter. The controller is configured to improve a power factor of the motor controller by controlling the AC input current based on a direct current (DC) link voltage measurement.

29 Claims, 12 Drawing Sheets

(56) References Cited

OTHER PUBLICATIONS

Haga, et al., "High power factor control of electrolytic capacitor less current-fed single-phase to three-phase power converter", 2010 International Power Electronics Conference, IEEE, Jun. 21-24, 2010, pp. 443-448, Japan.

Kimura et al., "Noble control strategy for single phase input indirect matrix converter used for sensorless PMSM drive of air-conditioner", Oct. 21-24, 2012, 5 pages, Japan.

Patent Examination Report No. 1, Application No. 2013204711 mailed Aug. 18, 2014, 4 pages.

* cited by examiner

Duty Cycle Limiting Disabled

Duty Cycle Limiting Enabled

SYSTEMS AND METHODS FOR CONTROLLING ELECTRIC MACHINES

BACKGROUND

The field of the disclosure relates generally to electric motor controllers, and more specifically to methods and a controller for reducing size and costs of motor controllers for electric motors.

Devices commonly known as electronic motor controllers are utilized to control the operation of certain electric motors. At least some known motor controllers have attempted to reduce cost and save resources by replacing large-capacity smoothing capacitors with small-capacity capacitors. Because of the small-capacity capacitor, a rectified input voltage to be applied to an inverter is unable to be properly smoothed and has a pulsating waveform. The voltage of the pulsating waveform has a frequency about twice that of an output voltage of an alternating current (AC) power supply to which it is connected.

When using electric motor controllers, a sinusoidal input current may be sacrificed, which can lead to a poor power factor for the electric motor. Active power factor correction devices are known to correct the power factor, but are typically large in size and are often costly. Alternatively, at least some known motor controllers apply a torque command to be synchronous with line input voltage to correct poor power factor. However, measuring line input voltage necessitates an additional isolated voltage sensor, which increases the system cost.

BRIEF DESCRIPTION

In one aspect, a motor controller is provided that includes an inverter configured to drive an electric motor, a rectifier configured to rectify an alternating current (AC) input current and to output the rectified AC input current to the inverter, and a controller coupled to the inverter. The controller is configured to improve a power factor of the motor controller by controlling the AC input current based on a direct current (DC) link voltage measurement.

In another aspect, a method of controlling an electric motor using a motor controller is provided. The method includes controlling an AC input current based on a DC link voltage measurement to improve a power factor of the motor controller.

In yet another aspect, a system is provided that includes an electric motor, an inverter configured to drive the electric motor, and a motor controller coupled to the inverter. The motor controller includes a rectifier and is configured to improve a power factor of the motor controller by controlling an AC input current based on a DC link voltage measurement.

DETAILED DESCRIPTION

The embodiments described herein relate to electric motor controllers and methods of operating the same. More particularly, the embodiments relate to a motor controller that eliminates large filter capacitors and maintains a high power factor for an electric motor. More particularly, the embodiments relate to a motor controller configured to control AC input current based on based on a direct current (DC) link voltage measurement to facilitate improving a power factor of the electric motor. It should be understood that the embodiments described herein for electrical machines are not limited to motors, and should be further understood that the descriptions and figures that utilize a motor are exemplary only. Moreover, while the embodiments illustrate a three phase electric motor, the embodiments described herein may be included within motors having any number of phases, including single phase and multiple phase electric motors.

Figure 1:
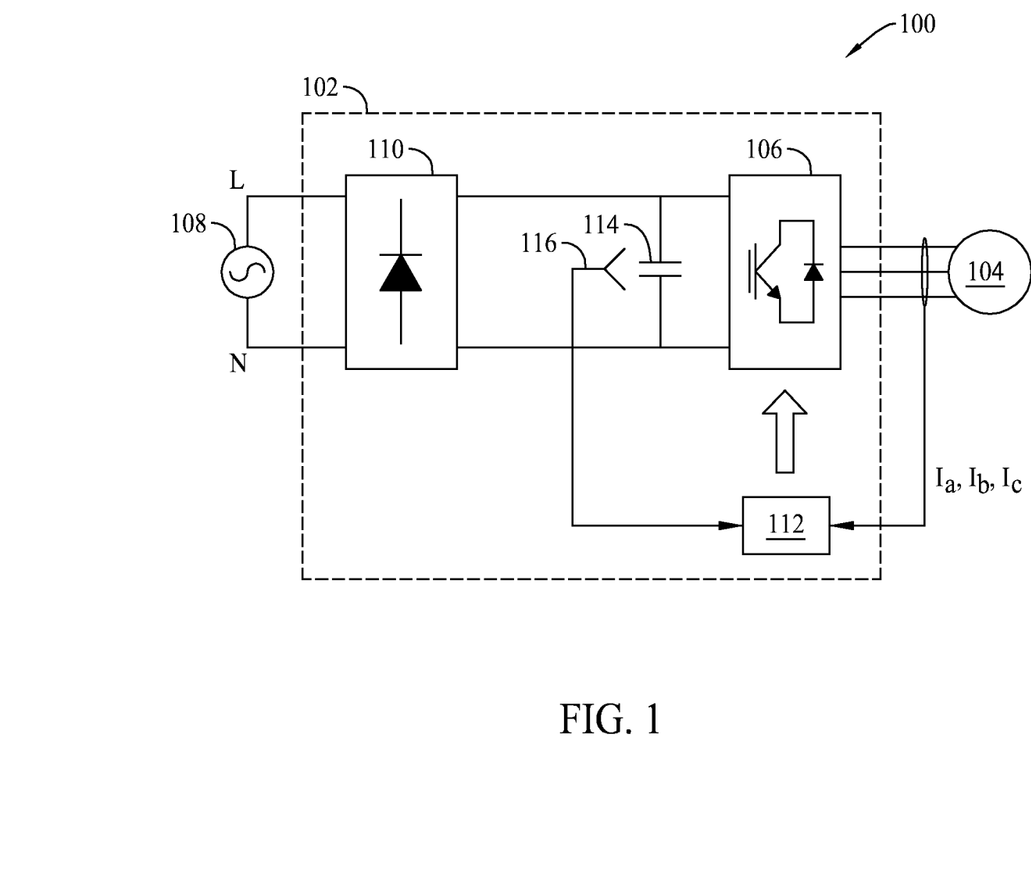
FIG. 1 is a block diagram of an exemplary motor control system.

FIG. 1 is a block diagram of an electric motor system 100 that includes a motor controller 102. In the exemplary embodiment, electric motor system 100 also includes an electric motor 104, an inverter 106 coupled to electric motor 104, and a power supply 108 coupled to motor controller 102. In the exemplary embodiment, electric motor 102 includes a permanent magnet synchronous motor. However, any type of electric motor may be used that enables electric motor system 100 to function as described herein.

In the exemplary embodiment, power supply 108 supplies a single-phase alternating current (AC) voltage to motor controller 102. However, power supply 108 may supply three-phase AC or any other type of input voltage that enables electric motor system 100 to function as described herein.

Inverter 106 conditions a pulsed DC voltage received from motor controller 102, and supplies it to electric motor 104, where it is used drive electric motor 104. In the exemplary embodiment, inverter 106 converts the pulsed DC voltage to a three-phase AC voltage. Alternatively, inverter 106 converts the pulsed DC voltage to any type of voltage that enables electric motor system 100 to function as described herein.

In the exemplary embodiment, motor controller 102 includes a rectifier 110 configured to rectify an alternating current (AC) input current and to output the rectified AC input current to inverter 106. A controller 112, which may sometimes be referred to as a microcontroller/DSP, is programmed to control operation of a rotating machine portion (not shown) of electric motor 104. Six pulse width modulated signals are utilized to induce rotation of the rotating machine, via inverter 106, which enables electric motor 104 to be referred to as a three-phase motor. Signals received from the rotating machine at controller 112 include signals relating to the current drawn by each of the phases and an AC input current, or DC bus voltage. Controller 112 is coupled to inverter 106 and is configured to increase a power factor of electric motor 104 by controlling the AC input current based on a direct current (DC) link voltage measurement, as described in more detail herein.

In some embodiments, motor controller 102 includes a low-capacitance capacitor 114 for storing small amounts of energy when input voltage is available. Capacitor 114 also supplies power to the electronics of motor controller 102. In one embodiment, film capacitor 114 has a capacitance of about 2 µF. Capacitor 114 may have a capacitance between about 0.1 µF/kW and about 10 µF/kW. The use of bulky, unreliable electrolytic filter capacitors in motor controller 102 is avoided.

Motor controller 102 also includes a voltage sensor 116 coupled across capacitor 114. Voltage sensor 116 is configured to measure a DC link voltage across capacitor 114. Voltage sensor 116 provides a DC link voltage measurement to controller 112 for use in controlling electric motor 102 to increase a power factor of electric motor by controlling the AC input current based on the DC link voltage measurement. More specifically, controller 112 is configured to implement an algorithm configured to increase power factor based on the DC link voltage measurement from voltage sensor 116.

Figure 2:
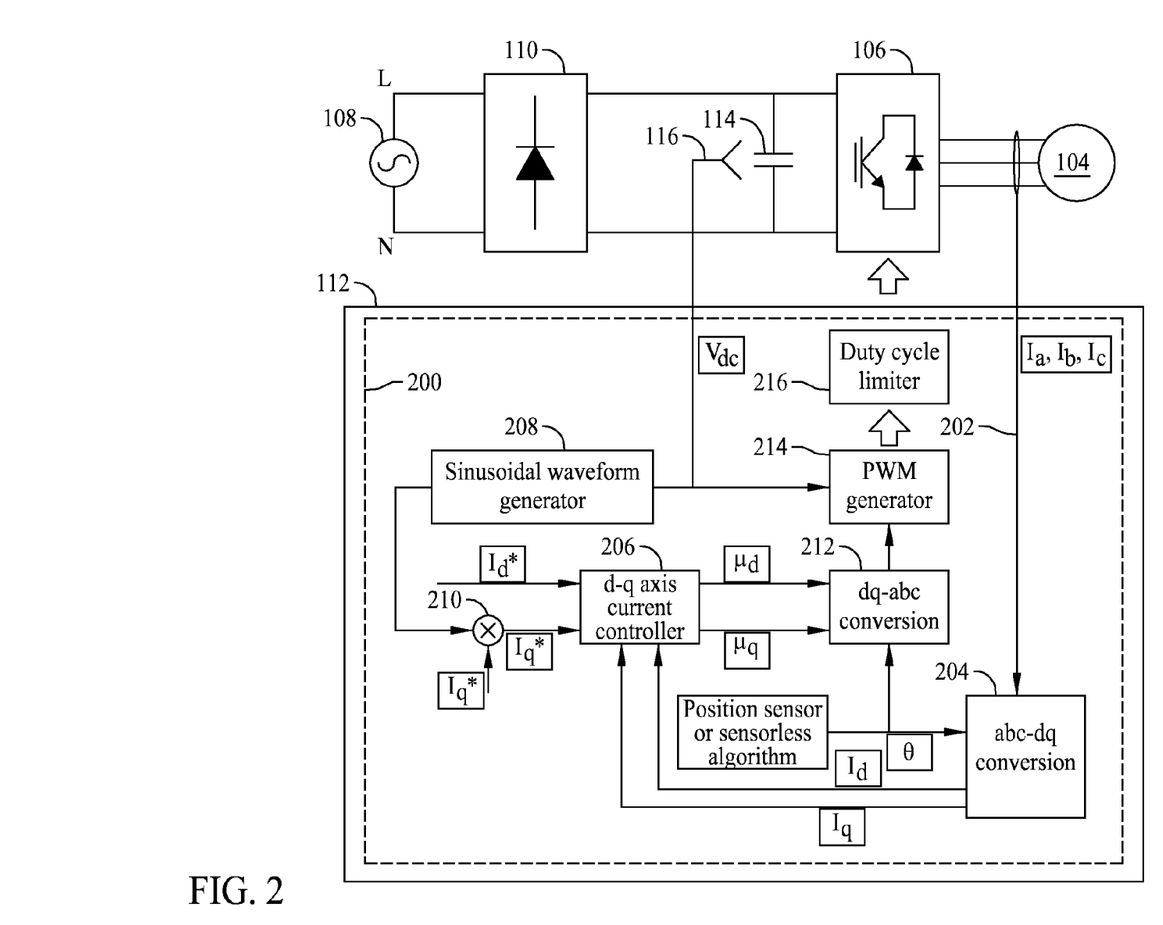
FIG. 2 is a block diagram of an exemplary power factor correction algorithm that may be implemented by the motor controller shown in FIG. 1.

FIG. 2 is a block diagram of an exemplary power factor correction algorithm 200 that may be implemented by motor controller 102 (shown in FIG. 1). In the exemplary embodiment, controller 102 is configured to implement the algorithm to determine a q-axis reference value based on measured DC link voltage.

In the exemplary embodiment, motor phase currents $I_a$, $I_b$, and $I_c$ are sensed using current sensors 202. An abc-dq converter 204 converts the three-phase current values to a two-phase d-q coordinate system, giving measured current values $I_d$ and $I_q$, which are input into a d-q axis current controller 206.

A sinusoidal waveform generator 208 receives a measured DC link voltage from voltage sensor 116 (shown in FIG. 1) and generates a sinusoidal waveform. The sinusoidal waveform is multiplied by a current reference signal $I_q^*$ at multiplier 210. $I_q^*$ represents a torque component of current. The resulting $I_q^*$ current reference is input into d-q axis current controller 206. The $I_q^*$ has twice the line frequency (i.e., 100 Hz or 120 Hz), and is in phase (or slightly advanced/delayed) with input line voltage from power supply 108 (shown in FIG. 1).

The $I_q^*$ and $I_d^*$ (flux-linkage component of current) reference signals are input into d-q axis current controller 206. D-q axis current controller 206 processes the $I_q^*$ and $I_d^*$ reference signals with the measured current values $I_d$ and $I_q$. D-q axis current controller 206 outputs voltage reference signals $u_q$ and $u_d$. Voltage reference signals $u_q$ and $u_d$ are converted back into three-phase values by a dq-abc converter 212. The three-phase voltage reference signals $u_q$ and $u_d$ are input into a pulse width modulator (PWM) 214, which has a six-step transformation with six outputs that drive inverter 106. In some embodiments, the signal output by PWM 214 is limited by a duty cycle limiter 216 before being transmitted to inverter 106.

In the exemplary embodiment, electric motor 104 is controlled based on the availability of power. More specifically, controller 112 receives the measured DC link voltage from voltage sensor 116 and outputs the sinusoidal waveform. This waveform is multiplied by torque command $I_q^*$ to become the q-axis current reference $I_q^*$. Accordingly, controller 112 controls AC input current based on the DC link voltage measurement, while increasing the power factor of electric motor 104.

Figure 3:
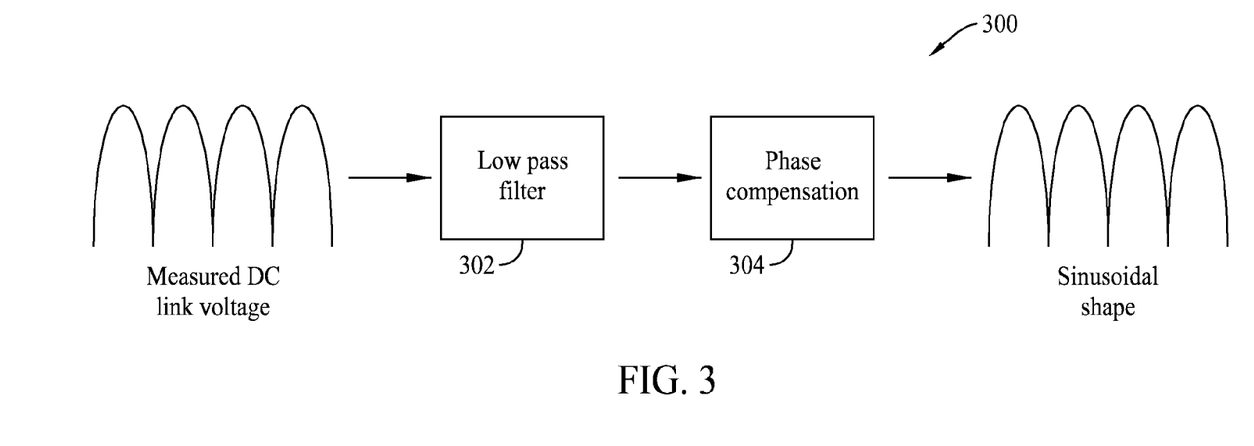
FIG. 3 is a simplified block diagram of an exemplary sinusoidal waveform generation device that may be used by the sinusoidal waveform generator shown in FIG. 2.

FIG. 3 is a simplified block diagram of an exemplary sinusoidal waveform generation device 300 that may be used by the sinusoidal waveform generator shown in FIG. 2. In the exemplary embodiment, sinusoidal waveform generation device 300 includes a low pass filter 302 coupled to a phase compensator 304.

DC link voltage measured by voltage sensor 116 (shown in FIGS. 1 and 2) is input into low pass filter 302. Low pass filter 302 is configured to have a cut-off frequency lower than a switching frequency of inverter 106 (shown in FIGS. 1 and 2), but higher than twice the line frequency (100 Hz or 120 Hz). Such configuration maintains the 100 Hz or 120 Hz frequency component in the DC link voltage. Low pass filter 302 filters out a high frequency component of the DC link voltage and transmits it to phase compensator 304.

In some instances, the filtering by low pass filter 302 causes a phase delay, so phase compensator 304 is provided to correct the phase of the DC link voltage. Once the phase is corrected, the sinusoidal waveform is sent to multiplier 210 (shown in FIG. 2) to generate the q-axis reference.

Figure 4:
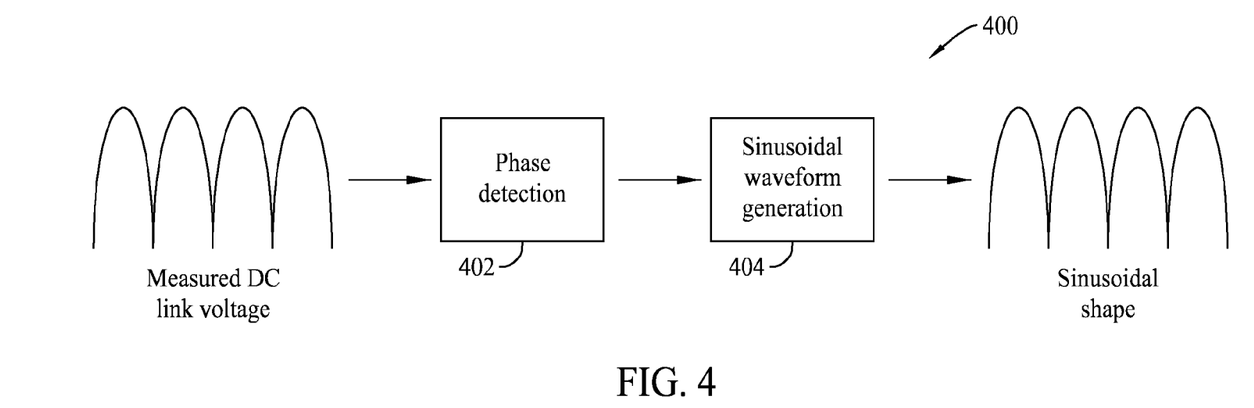
FIG. 4 is a simplified block diagram of an exemplary sinusoidal waveform generation device that may be used by the sinusoidal waveform generator shown in FIG. 2.

FIG. 4 is a simplified block diagram of an exemplary sinusoidal waveform generation device 400 that may be used by the sinusoidal waveform generator shown in FIG. 2. In the exemplary embodiment, sinusoidal waveform generation device 400 includes a phase detector 402 coupled to a sinusoidal generator 404.

DC link voltage measured by voltage sensor 116 (shown in FIGS. 1 and 2) is input into phase detector 402. Phase detector 402 implements one or more phase detection algorithms to determine the phase of the measured DC link voltage. The algorithms may include a phase lock loop and/or a zero crossing point detection method.

Sinusoidal generator 402 uses the phase of the measured DC link voltage to generate a sinusoidal waveform. The sinusoidal waveform is then sent to multiplier 210 (shown in FIG. 2) to generate the q-axis reference.

Figure 5:
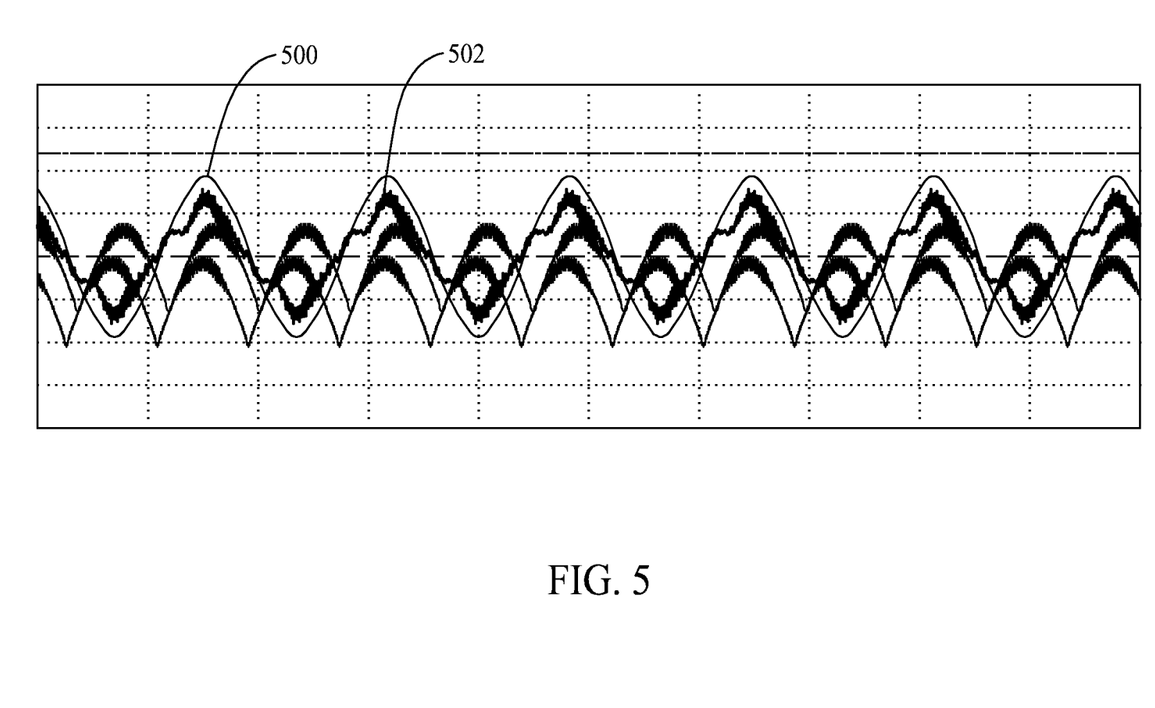
FIG. 5 illustrates a waveform chart of input signals achieved using the exemplary power factor correction algorithm shown in FIG. 2.

FIG. 5 illustrates a waveform chart of input signals achieved using the exemplary power factor correction algorithm shown in FIG. 2. In the exemplary embodiment, AC line voltage 500 is at 60 Hertz (Hz.). AC line current 502 has a quasi-sinusoidal shape and is in-phase or substantially in-phase with AC line voltage 500. Because $I_q$ is modulated near 120 Hz, AC line current 502 is forced to follow the sinusoidal shape of AC line voltage 500, leading to a higher power factor for motor controller 102 (shown in FIG. 1).

Figure 6:
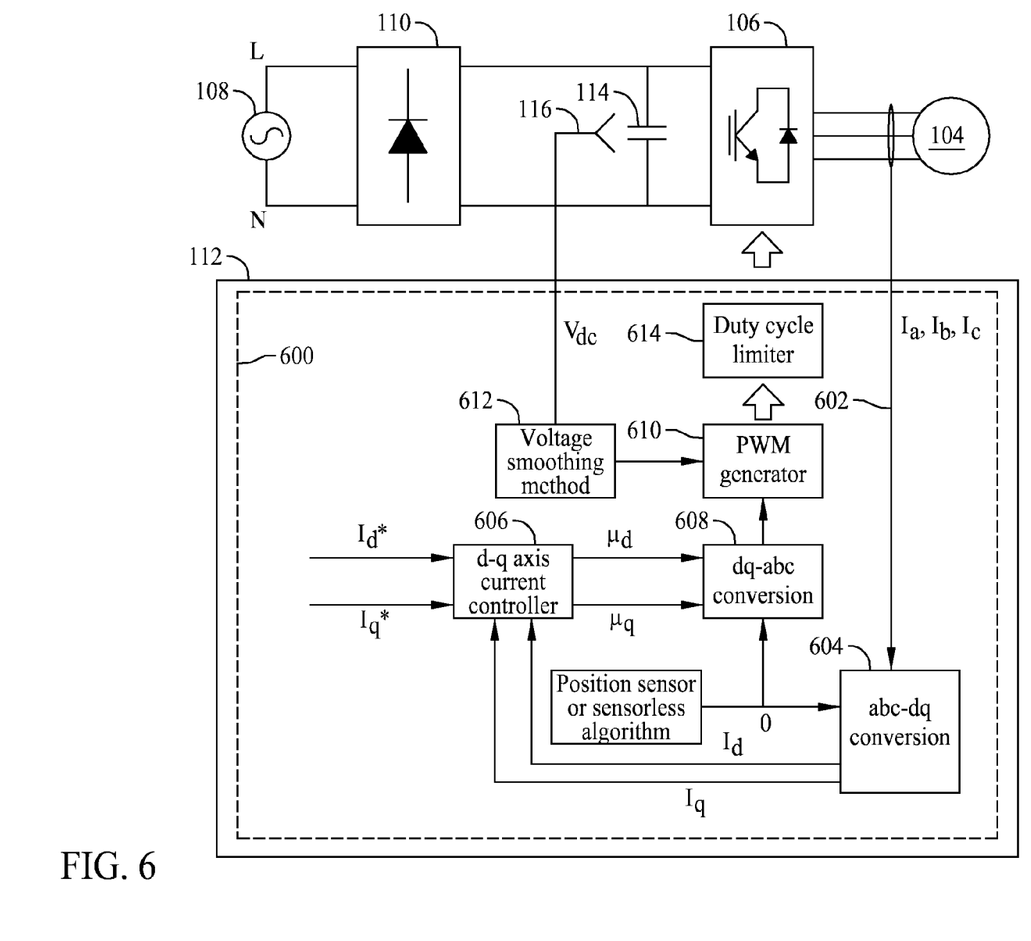
FIG. 6 is a block diagram of a first alternative power factor correction algorithm that may be implemented by the motor controller shown in FIG. 1.

FIG. 6 is a block diagram of a first alternative power factor correction algorithm 600 that may be implemented by motor controller 102 (shown in FIG. 1). In the exemplary embodiment, controller 102 is configured to implement the algorithm to smooth the DC link voltage before generating a pulse width modulation (PWM) signal.

In the exemplary embodiment, motor phase currents $I_a$, $I_b$, and $I_c$ are sensed using current sensors 602. An abc-dq converter 604 converts the three-phase current values to a two-phase d-q coordinate system, giving measured current values $I_d$ and $I_q$, which are input into a d-q axis current controller 606.

Current reference values $I_d^*$ and $I_q^*$ are input into d-q axis current controller 606. D-q axis current controller 606 processes the $I_q^*$ and $I_d^*$ reference signals with the measured current values $I_d$ and $I_q$. D-q axis current controller 606 outputs voltage reference signals $u_q$ and $u_d$. Voltage reference signals $u_q$ and $u_d$ are converted back into three-phase values by a dq-abc converter 608. The three-phase voltage reference signals $u_q$ and $u_d$ are input into a PWM generator 610, which has a six-step transformation with six outputs that drive inverter 106.

A voltage smoother 612 is coupled between voltage sensor 116 and PWM generator 610. Because DC link voltage is needed for PWM duty ratio calculation, the switching harmonics in the DC link voltage may be introduced to PWM duty ratio, causing resonance issues. Voltage smoother 612 smoothes the DC link voltage and avoids such resonance issues, which improves the power factor of motor controller 102 and improves the current waveform of electric motor 104. In one embodiment, voltage smoother 612 includes sinusoidal waveform generation device 300 (shown in FIG. 3), including low pass filter 302 and phase compensator 304. In another embodiment, voltage smoother 612 includes sinusoidal waveform generation device 400 (shown in FIG. 4), including phase detector 402 and sinusoidal generator 404. PWM generator 610 then outputs three-phase voltage command signals $V_a$, $V_b$, and $V_c$ to a duty cycle limiter 614.

Figure 7:
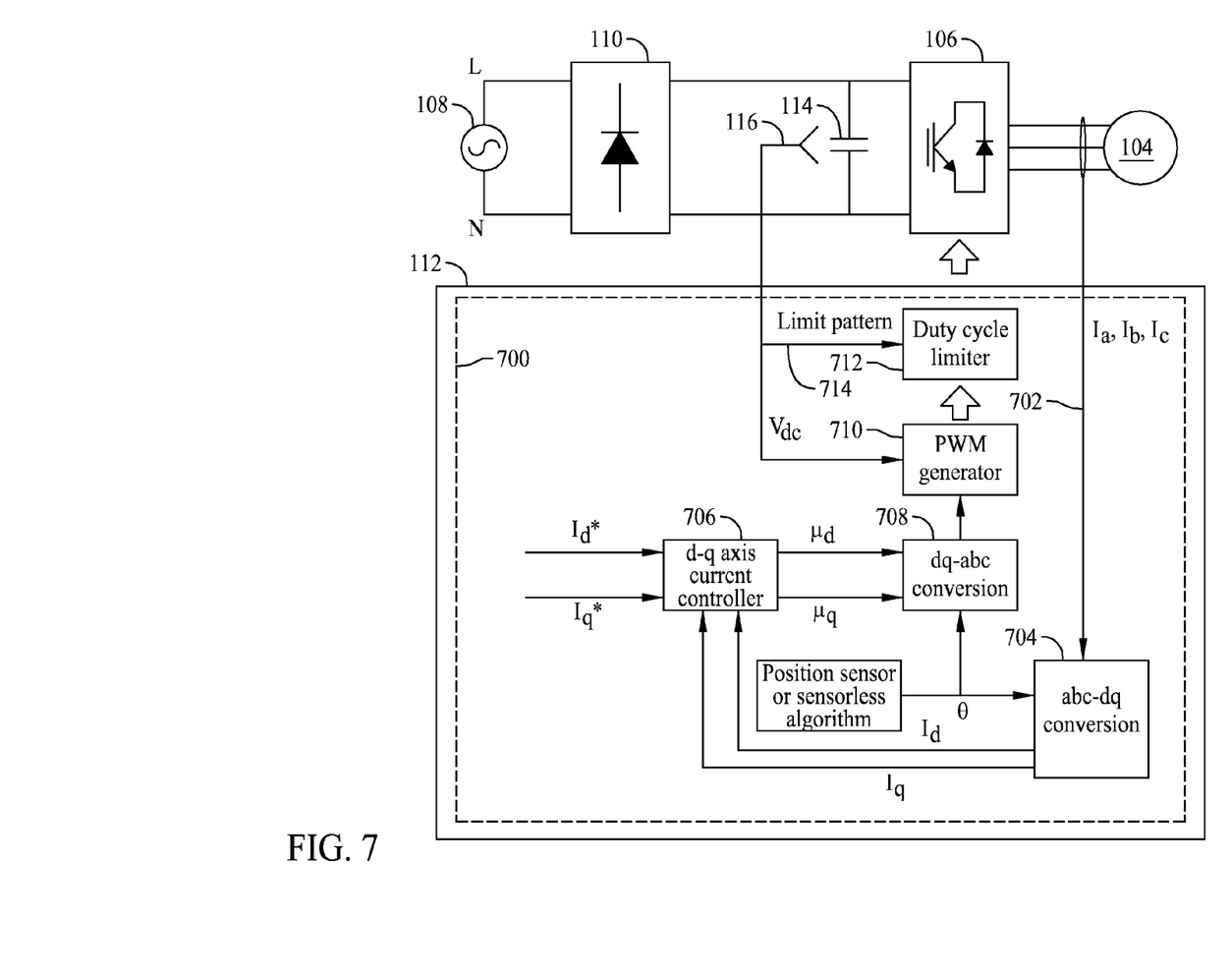
FIG. 7 is a block diagram of a second alternative power factor correction algorithm that may be implemented by the motor controller shown in FIG. 1.

FIG. 7 is a block diagram of a second alternative power factor correction algorithm 700 that may be implemented by motor controller 102 (shown in FIG. 1). In the exemplary embodiment, controller 102 is configured to implement the algorithm to control a duty cycle of at least one voltage commanded by said controller.

In the exemplary embodiment, motor phase currents $I_a$, $I_b$, and $I_c$ are sensed using current sensors 702. An abc-dq converter 704 converts the three-phase current values to a two-phase d-q coordinate system, giving measured current values $I_d$ and $I_q$, which are input into a d-q axis current controller 706.

Current reference values $I_d^*$ and $I_q^*$ are input into d-q axis current controller 706. D-q axis current controller 706 processes the $I_q^*$ and $I_d^*$ reference signals with the measured current values $I_d$ and $I_q$. D-q axis current controller 706 outputs voltage reference signals $u_q$ and $u_d$. Voltage reference signals $u_q$ and $u_d$ are converted back into three-phase values by a dq-abc converter 708. The three-phase voltage reference signals $u_q$ and $u_d$ are input into a PWM generator 710, which has a six-step transformation with six outputs that drive inverter 106. PWM generator 710 then outputs three-phase voltage command signals $V_a$, $V_b$, and $V_c$ to a duty cycle limiter 712.

Duty cycle limiter 712 employs different types of limiting functions 714 around the zero crossings of the AC line current, including but not limited to, linear and/or polynomial limiting functions. In the exemplary embodiment, duty cycle limiter 712 uses a sinusoidal limiting function derived and/or synchronized from AC power source 108. After applying limiting function 714 to voltage command signals $V_a$, $V_b$, and $V_c$, duty cycle limiter 712 outputs modulated voltage reference signals $V_a^*$, $V_b^*$, and $V_c^*$ to inverter 106 for driving electric motor 104.

Figure 8:
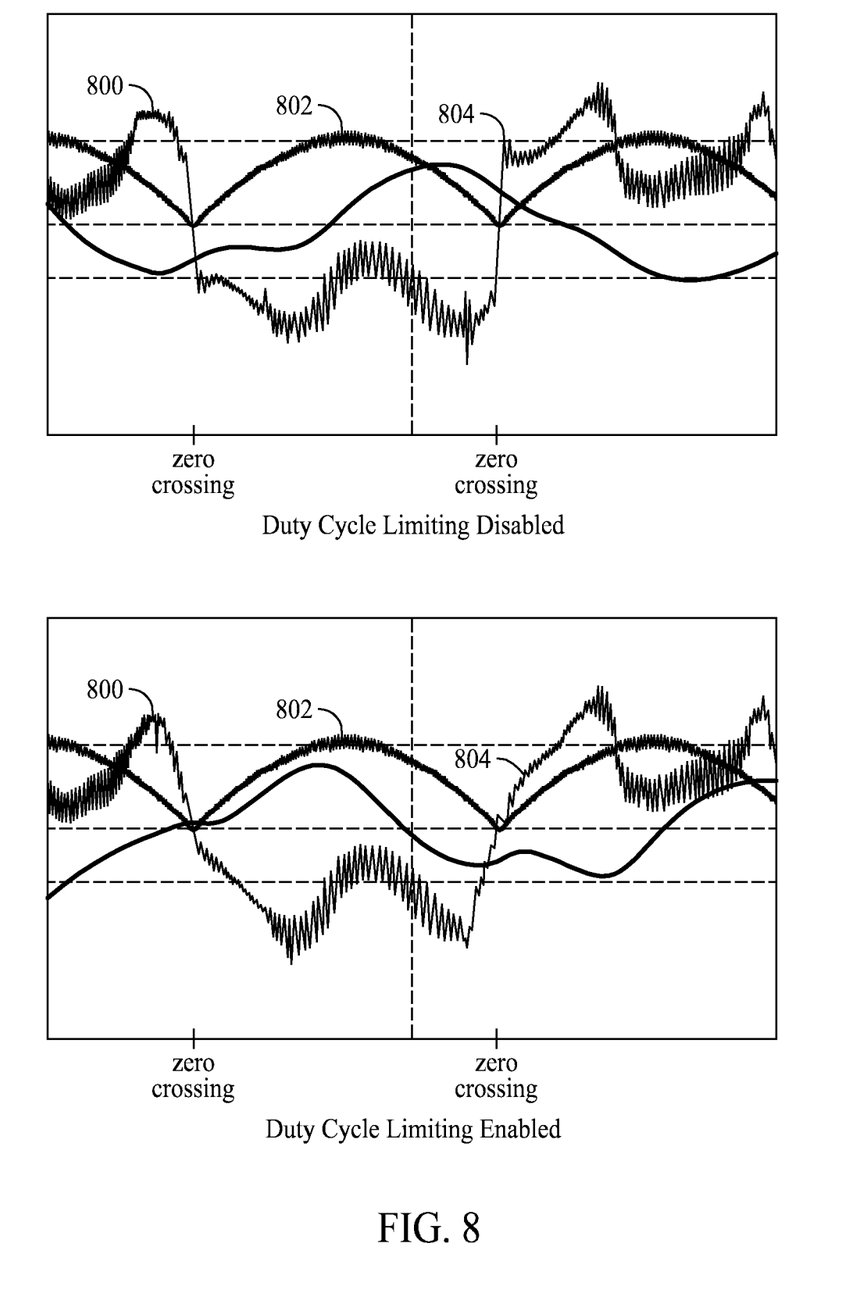
FIG. 8 illustrates a waveform chart of input signals achieved using the second alternative power factor correction algorithm shown in FIG. 7.

FIG. 8 illustrates a waveform chart of input signals achieved using the second alternative power factor correction algorithm shown in FIG. 7. Controlling the duty cycle includes controlling the AC line current 800 to shape it near the vicinity of the zero crossings of the AC source voltage 802. By doing so, sharp transitions 804 in AC line current 800 are smoothed and the power factor is improved, as can be seen in the duty cycle limiting enabled graph. Duty cycle limiter 712 also assists in the prevention of oscillations in the AC line current (or bus voltage) by gradual regulation of the load flow independently of the output swings in d-q axis current controller 706.

Figure 9:
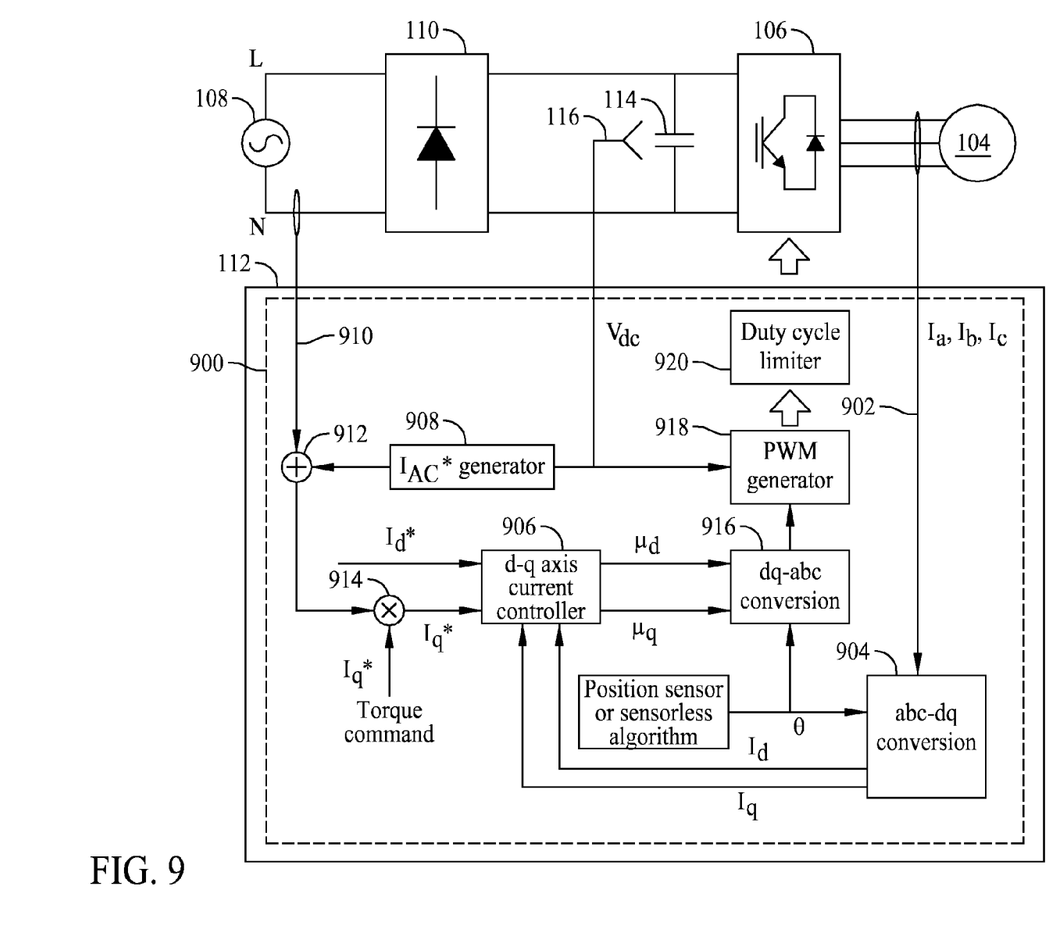
FIG. 9 is a block diagram of a third alternative power factor correction algorithm that may be implemented by the motor controller shown in FIG. 1.

FIG. 9 is a block diagram of a third alternative power factor correction algorithm 900 that may be implemented by motor controller 102 shown in FIG. 1. In the exemplary embodiment, controller 102 is configured to implement an algorithm to increase the power factor based on the DC link voltage measurement and an AC line current measurement.

In the exemplary embodiment, motor phase currents $I_a$, $I_b$, and $I_c$ are sensed using current sensors 902. An abc-dq converter 904 converts the three-phase current values to a two-phase d-q coordinate system, giving measured current values $I_d$ and $I_q$, which are input into a d-q axis current controller 906.

A current reference generator 908 receives a measured DC link voltage from voltage sensor 116 (shown in FIG. 1) and generates a sinusoidal AC current reference signal $I_{AC}^*$. Additionally, AC line current $I_{AC}$ is measured using a current sensor 910. $I_{AC}$ is subtracted from $I_{AC}^*$ in summing junction 912. The resultant signal is multiplied by a torque command $I_q^{*'}$ at multiplier 914. The resulting $I_q^*$ current reference is input into d-q axis current controller 906.

Current reference values $I_d^*$ and $I_q^*$ are input into d-q axis current controller 906. D-q axis current controller 906 processes the $I_q^*$ and $I_d^*$ reference signals with the measured current values $I_d$ and $I_q$. D-q axis current controller 906 outputs voltage reference signals $u_q$ and $u_d$. Voltage reference signals $u_q$ and $u_d$ are converted back into three-phase values by a dq-abc converter 916. The three-phase voltage reference signals $u_q$ and $u_d$ are input into a PWM generator 918, which has a six-step transformation with six outputs that drive inverter 106. PWM generator 918 then outputs three-phase voltage command signals $V_a$, $V_b$, and $V_c$ to a duty cycle limiter 920. Duty cycle limiter 920 uses the values inputted to adjust the duty cycle of the AC line current so as to optimize the power flow to achieve sinusoidal AC input line current.

Figure 10:
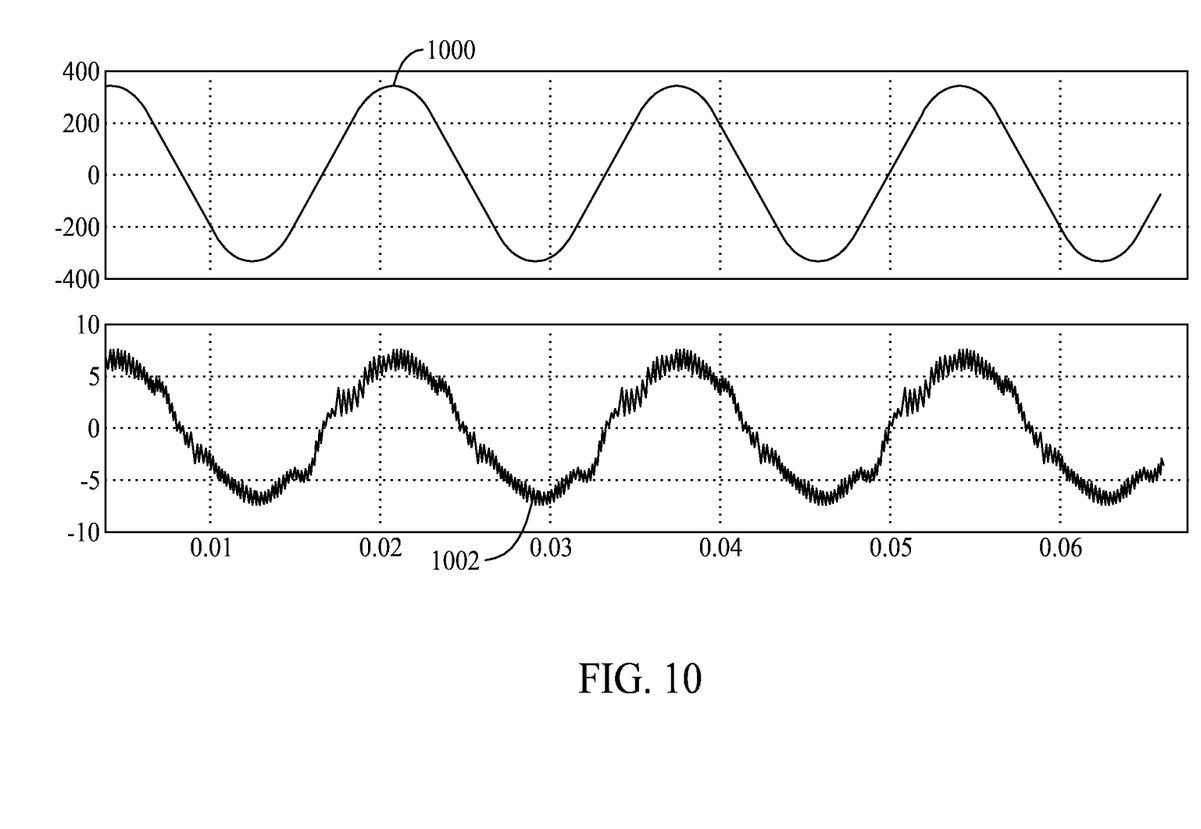
FIG. 10 illustrates a waveform chart of input signals achieved using the exemplary power factor correction algorithm shown in FIG. 9.

FIG. 10 illustrates a waveform chart of input signals achieved using the third alternative power factor correction algorithm shown in FIG. 9. As shown in FIG. 10, AC line voltage 1000 and AC line current 1002 are in-phase, or substantially in-phase to achieve a near unity power factor. The near unity power factor is accomplished by sensing AC input current and controlling or reconstructing it to have a sinusoidal waveform to match the AC input voltage.

Figure 11:
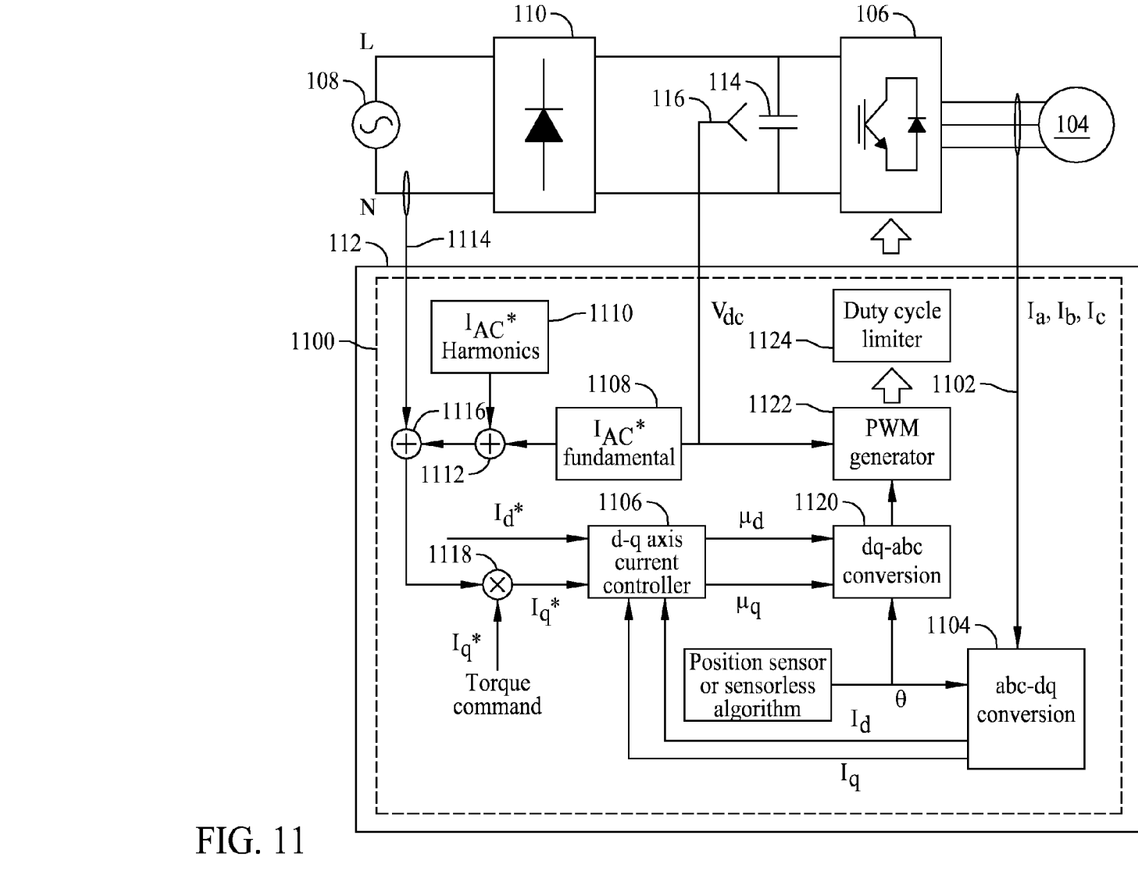
FIG. 11 is a block diagram of a fourth alternative power factor correction algorithm that may be implemented by the motor controller shown in FIG. 1.

FIG. 11 is a block diagram of a fourth alternative power factor correction algorithm 1100 that may be implemented by motor controller 102 (shown in FIG. 1). In the exemplary embodiment, controller 102 is configured to implement an algorithm to increase the power factor based on the DC link voltage measurement and an AC line current measurement, and adjust a harmonic content of electric motor 104 (shown in FIG. 1).

In the exemplary embodiment, motor phase currents $I_a$, $I_b$, and $I_c$ are sensed using current sensors 1102. An abc-dq converter 1104 converts the three-phase current values to a two-phase d-q coordinate system, giving measured current values $I_d$ and $I_q$, which are input into a d-q axis current controller 1106.

A current reference generator 1108 receives a measured DC link voltage from voltage sensor 116 (shown in FIG. 1) and generates a fundamental AC current reference signal $I_{AC\_fundamental}*$. Additionally, a harmonic generation unit 1110 generates a harmonic signal $I_{AC\_harmonics}*$. $I_{AC\_fundamental}*$ and $I_{AC\_harmonics}*$ are summed at first summing junction 1112 to form an AC current reference signal $I_{AC}*$. Modification of the harmonic content enables motor controller 102 to achieve an improved power factor for electric motor 104 (shown in FIG. 1).

Additionally, AC line current $I_{AC}$ is measured using a current sensor 1114. $I_{AC}$ is subtracted from $I_{AC}*$ in second summing junction 1116. The resultant signal is multiplied by a torque command $I_q*'$ at multiplier 1118. The resulting $I_q*$ current reference is input into d-q axis current controller 1106.

Current reference values $I_d*$ and $I_q*$ are input into d-q axis current controller 1106. D-q axis current controller 1106 processes the $I_q*$ and $I_d*$ reference signals with the measured current values $I_d$ and $I_q$. D-q axis current controller 1106 outputs voltage reference signals $u_q$ and $u_d$. Voltage reference signals $u_q$ and $u_d$ are converted back into three-phase values by a dq-abc converter 1120. The three-phase voltage reference signals $u_q$ and $u_d$ are input into a PWM generator 1122, which has a six-step transformation with six outputs that drive inverter 106. PWM generator 1122 then outputs three-phase voltage command signals $V_a$, $V_b$, and $V_c$ to a duty cycle limiter 1124. Duty cycle limiter 1124 uses the values inputted to adjust the duty cycle of the AC line current so as to optimize the power flow to achieve sinusoidal AC input line current.

Figure 12:
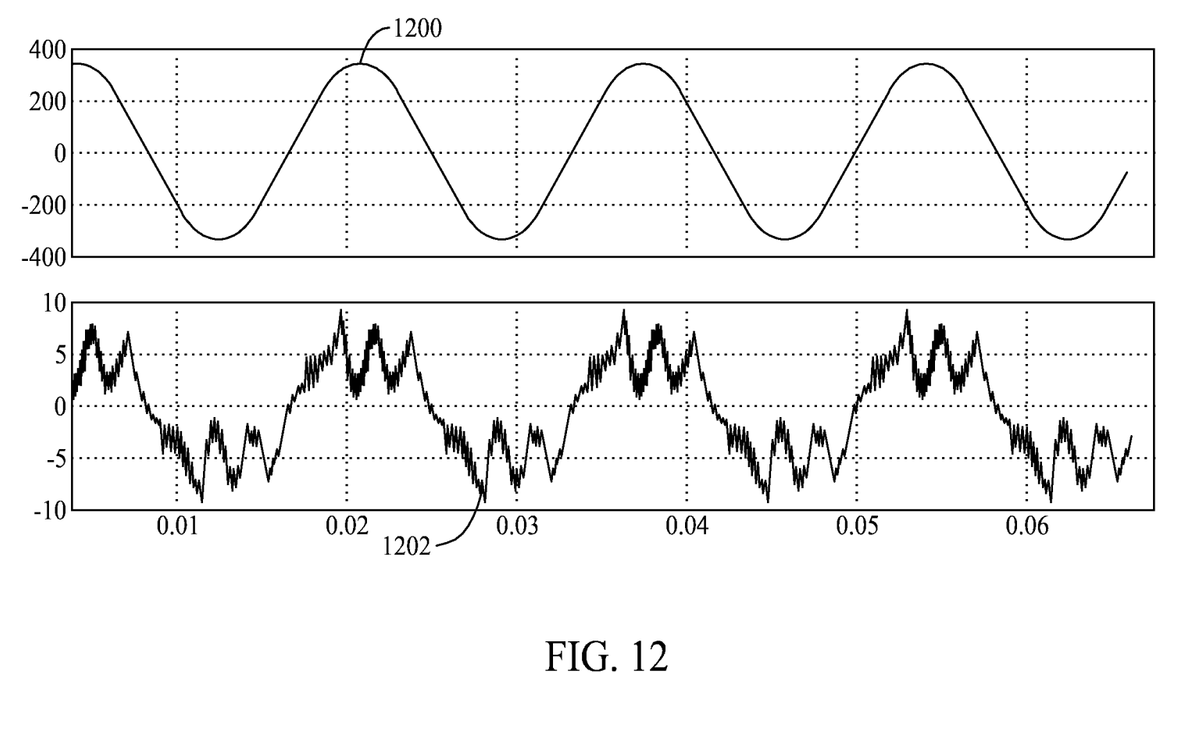
FIG. 12 illustrates a waveform chart of input signals achieved using the exemplary power factor correction algorithm shown in FIG. 11.

FIG. 12 illustrates a waveform chart of input signals achieved using the exemplary power factor correction algorithm shown in FIG. 11. In the exemplary embodiment, the waveform chart includes AC line voltage 1200 and AC line current 1202 when motor controller 102 (shown in FIG. 1) implements algorithm 1100. In the exemplary embodiment, the harmonic control algorithm 1100 enables power factor correction using AC line current measurement with seventh harmonic injection. However, any order harmonic injection may be used that enables motor controller 102 to function as described herein. When a wave form that does not have the seventh harmonic is desired, the seventh harmonic is either added or subtracted from the current reference $I_{AC\_fundamental}*$. This summation enables modification of the shape of the AC line current 1202 by injecting harmonics into the current wave form. The injected harmonics alter the wave form of AC line current 1202 such that its phase becomes close to being the phase of AC line voltage 1200, resulting in an increased power factor. The increased power factor is accomplished by sensing the AC input current, and controlling or reconstructing it using harmonic control to improve power flow from power source 108 to electric motor 104.

Figure 13:
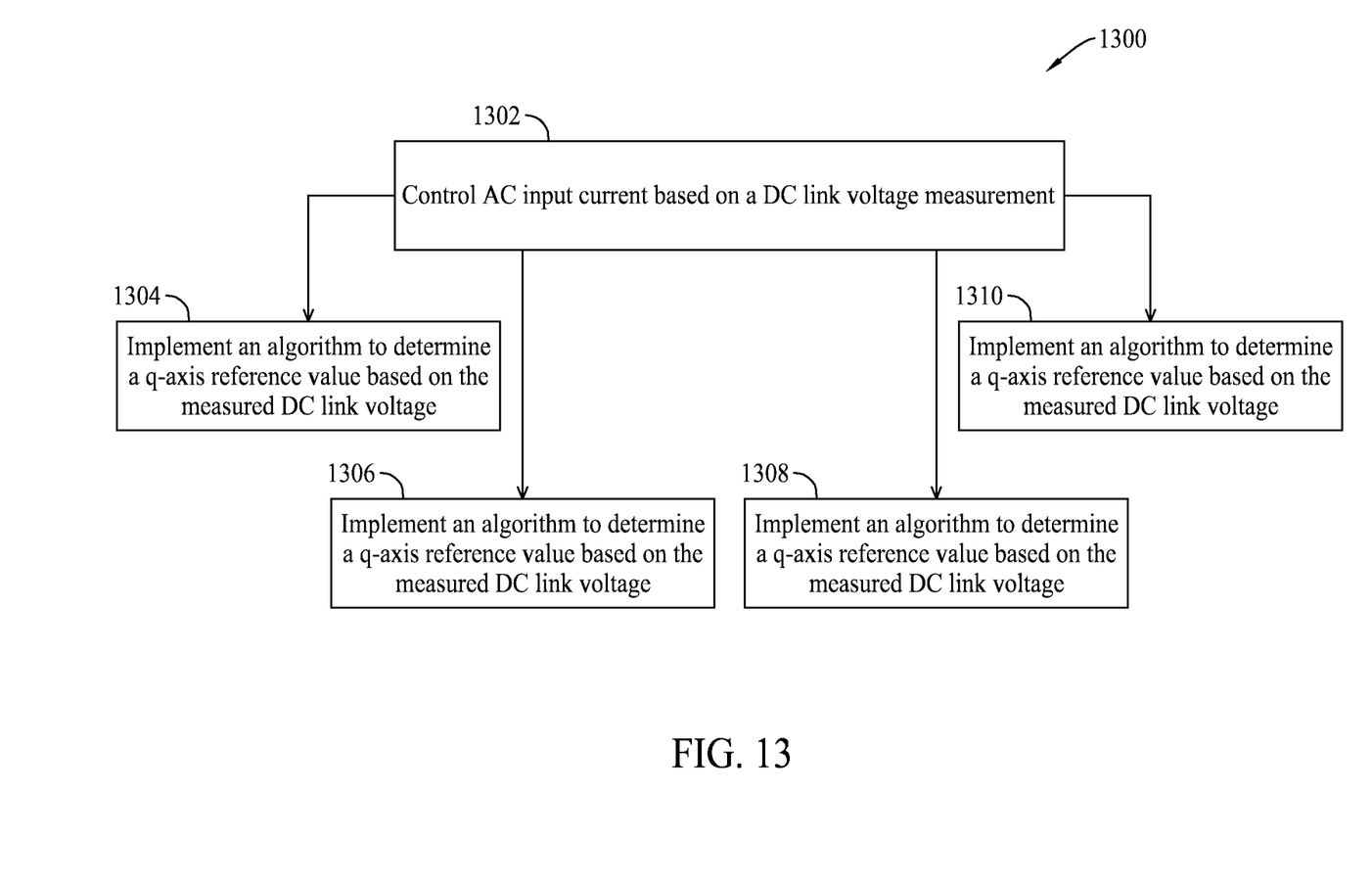
FIG. 13 illustrates a flowchart of an exemplary method of operating an electric motor using a motor controller.

FIG. 13 is a flowchart 1300 of an exemplary method of controlling an electric motor using a motor controller. In the exemplary embodiment, the method includes controlling 1302 an AC input current based on a DC link voltage measurement to improve a power factor of the electric motor. For example, controlling the AC input current includes implementing 1304 an algorithm to determine a q-axis reference value based on the measured DC link voltage. More specifically, in one embodiment, determining the q-axis reference value includes measuring the DC link voltage using a voltage detector, processing the measured DC link voltage using a low-pass filter having a cut-off frequency lower than a switching frequency of said inverter and higher than twice the AC line frequency, phase shifting the processed DC link voltage, and multiplying the phase shifted voltage by a torque command. In an alternative embodiment, determining the q-axis reference value includes measuring the DC link voltage using a voltage detector, processing the measured DC link voltage using a phase detector, generating a sinusoidal-shaped waveform based on the measured phase, and multiplying the sinusoidal-shaped waveform by a torque command.

In another embodiment, controlling the AC input current includes implementing 1306 an algorithm to smooth the DC link voltage before generating a pulse width modulation (PWM) signal.

In yet another embodiment, controlling the AC input current includes implementing 1308 an algorithm to control a duty cycle of at least one voltage commanded by the controller.

A technical effect of the systems and methods described herein includes at least one of: (a) controlling an AC input current based on a DC link voltage measurement to improve a power factor of the motor controller; (b) implementing an algorithm to determine a q-axis reference value based on the measured DC link voltage; (c) implementing an algorithm to smooth the DC link voltage before generating a PWM signal; and (d) implementing an algorithm to control a duty cycle of at least one voltage commanded by the controller.

The embodiments described herein relate to electrical motor controllers and methods of operating the same. More particularly, the embodiments relate to a motor controller that eliminates large filter capacitors and provides a high power factor. More particularly, the embodiments relate to a motor controller configured to control AC input current based on based on a direct current (DC) link voltage measurement to facilitate improving a power factor of the motor controller. The size ranges disclosed herein include all the sub-ranges therebetween. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor controller comprising:
an inverter configured to drive an electric motor;
a rectifier configured to rectify an alternating current (AC) input current and to output the rectified AC input current to said inverter; and
a controller coupled to said inverter and configured to improve a power factor of the motor controller by controlling the AC input current based on a direct current (DC) link voltage measurement without sensing AC line current.

2. A motor controller in accordance with claim 1, wherein said controller is configured to implement an algorithm configured to increase power factor based on the DC link voltage measurement.

3. A motor controller in accordance with claim 2, wherein said controller is configured to implement the algorithm to determine a q-axis reference value based on the measured DC link voltage.

4. A motor controller in accordance with claim 3, wherein to determine the q-axis reference value, said controller is configured to:
measure the DC link voltage using a voltage detector;
process the measured DC link voltage using a low-pass filter having a cut-off frequency lower than a switching frequency of said inverter and higher than twice the AC line frequency;
phase shift the processed DC link voltage; and
multiply the phase shifted voltage by a torque command.

5. A motor controller in accordance with claim 3, wherein to determine the q-axis reference value, said controller is configured to:
measure the DC link voltage using a voltage detector;
process the measured DC link voltage using a phase detector;
generate a sinusoidal-shaped waveform based on the measured phase; and
multiply the sinusoidal-shaped waveform by a torque command.

6. A motor controller in accordance with claim 5, wherein the phase detector implements one of a phase lock loop algorithm and a zero crossing point detection algorithm.

7. A motor controller in accordance with claim 2, wherein said controller is configured to implement the algorithm to smooth the DC link voltage before generating a pulse width modulation (PWM) signal.

8. A motor controller in accordance with claim 7, wherein said controller is configured to use the smoothed DC link voltage to avoid resonance in the generation of the PWM signal.

9. A motor controller in accordance with claim 2, wherein said controller is configured to implement the algorithm to control a duty cycle of at least one voltage commanded by said controller.

10. A motor controller in accordance with claim 9, wherein said controller is configured to control the duty cycle near a zero crossing of an AC input voltage.

11. A motor controller in accordance with claim 1, wherein said controller is configured to implement an algorithm to increase the power factor based on the DC link voltage measurement and an AC line current measurement.

12. A motor controller in accordance with claim 11, further comprising an AC line current sensor for measuring AC line current.

13. A motor controller in accordance with claim 11, wherein said controller is configured to:
measure the AC line current; and
adjust a duty cycle of the electric motor to improve power flow and generate a sinusoidal input current based on the measured AC line current.

14. A motor controller in accordance with claim 11, wherein said controller is configured to:
measure the AC line current; and
adjust a harmonic content of the AC line current by injecting harmonics into a q-axis reference value.

15. A motor controller in accordance with claim 1, wherein said controller is configured to increase the power factor of the motor controller without sensing AC line voltage.

16. A motor controller in accordance with claim 1, further comprising a capacitor coupled between said rectifier and said inverter, said capacitor having a capacitance between about 0.1 µF/kW and about 10 µF/kW.

17. A method of controlling an electric motor using a motor controller, said method comprising controlling an alternating current (AC) input current based on a direct current (DC) link voltage measurement to improve a power factor of the motor controller without sensing AC line current.

18. A method in accordance with claim 17, wherein controlling the AC input current comprises implementing an algorithm to determine a q-axis reference value based on the measured DC link voltage.

19. A method in accordance with claim 18, wherein determining the q-axis reference value comprises:
measuring the DC link voltage using a voltage detector;
processing the measured DC link voltage using a low-pass filter having a cut-off frequency lower than a switching frequency of said inverter and higher than twice the AC line frequency;
phase shifting the processed DC link voltage; and
multiplying the phase shifted voltage by a torque command.

20. A method in accordance with claim 18, wherein determining the q-axis reference value comprises:
measuring the DC link voltage using a voltage detector;
processing the measured DC link voltage using a phase detector;
generating a sinusoidal-shaped waveform based on the measured phase; and
multiplying the sinusoidal-shaped waveform by a torque command.

21. A method in accordance with claim 17, wherein controlling the AC input current comprises implementing an algorithm to smooth the DC link voltage before generating a pulse width modulation (PWM) signal.

22. A method in accordance with claim 17, wherein controlling the AC input current comprises implementing an algorithm to control a duty cycle of at least one voltage commanded by the controller.

23. A system comprising:
an electric motor;
an inverter configured to drive said electric motor; and
a motor controller coupled to said inverter, said motor controller comprising a rectifier, said motor controller configured to improve a power factor of the motor controller by controlling an alternating current (AC) input current based on a direct current (DC) link voltage measurement without sensing AC line current.

24. A system in accordance with claim 23, wherein said controller is configured to implement an algorithm to determine a q-axis reference value based on the measured DC link voltage.

25. A system in accordance with claim 23, wherein said controller is configured to implement the algorithm to smooth the DC link voltage before generating a pulse width modulation (PWM) signal.

26. A system in accordance with claim 23, wherein said controller is configured to implement the algorithm to control a duty cycle of at least one voltage commanded by said controller.

27. A system in accordance with claim 23, wherein said controller is configured to implement an algorithm to increase the power factor based on the DC link voltage measurement and an AC line current measurement.

28. A system in accordance with claim 23, wherein said controller is configured to:
    measure the AC line current; and
    adjust a duty cycle of the electric motor to improve power flow and generate a sinusoidal input current based on the measured AC line current.

29. A system in accordance with claim 23, wherein said controller is configured to:
    measure the AC line current; and
    adjust a harmonic content of the AC line current by injecting harmonics into a q-axis reference signal.

* * * * *